United States Patent
Shah et al.

(10) Patent No.: US 12,282,377 B2
(45) Date of Patent: Apr. 22, 2025

(54) HARDWARE-ASSISTED CORE FREQUENCY AND VOLTAGE SCALING IN A POLL MODE IDLE LOOP

(71) Applicant: Intel Corporation, Santa Clara, CA (US)

(72) Inventors: Pritesh P. Shah, Round Rock, TX (US); Suresh Chemudupati, Austin, TX (US); Alexander Gendler, Haifa (IL); David Hunt, Meelick (IE); Christopher M. Macnamara, Ballyclough (IE); Ofer Nathan, Haifa (IL); Adwait Purandare, Hillsboro, OR (US); Ankush Varma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/358,224

(22) Filed: Jun. 25, 2021

(65) Prior Publication Data

US 2022/0413591 A1 Dec. 29, 2022

(51) Int. Cl.
*G06F 1/3287* (2019.01)
*G06F 1/3228* (2019.01)
*G06F 1/3296* (2019.01)
*G06F 9/50* (2006.01)

(52) U.S. Cl.
CPC .......... *G06F 1/3287* (2013.01); *G06F 1/3228* (2013.01); *G06F 1/3296* (2013.01); *G06F 9/5094* (2013.01); *Y02D 10/00* (2018.01)

(58) Field of Classification Search
CPC .... G06F 1/3287; G06F 1/3228; G06F 1/3296; G06F 9/5094; Y02D 10/00
See application file for complete search history.

(56) References Cited

U.S. PATENT DOCUMENTS

| | | | |
|---|---|---|---|
| 8,010,824 B2 * | 8/2011 | Naffziger | G06F 1/3296 713/340 |
| 10,042,417 B2 * | 8/2018 | Hickey | G06F 1/3206 |
| 2013/0246708 A1 * | 9/2013 | Ono | G06F 12/0862 711/E12.024 |
| 2018/0364782 A1 | 12/2018 | Piga et al. | |

(Continued)

FOREIGN PATENT DOCUMENTS

JP 2009-009577 A 1/2009

OTHER PUBLICATIONS

International Search Report and Written Opinion, PCT App. No. PCT/US2022/021566, Jun. 24, 2022, 10 pages.

*Primary Examiner* — Corey S Faherty
(74) *Attorney, Agent, or Firm* — NICHOLSON DE VOS WEBSTER & ELLIOTT LLP

(57) ABSTRACT

A hardware controller within a core of a processor is described. The hardware controller includes telemetry logic to generate telemetry data that indicates an activity state of the core; core stall detection logic to determine, based on the telemetry data from the telemetry logic, whether the core is in an idle loop state; and a power controller that, in response to the core stall detection logic determining that the core is in the idle loop state, is to decrease a power mode of the core from a first power mode associated with a first set of power settings to a second power mode associated with a second set of power settings.

11 Claims, 8 Drawing Sheets

(56) References Cited

U.S. PATENT DOCUMENTS

| | | | |
|---|---|---|---|
| 2019/0012486 A1* | 1/2019 | Landau | G06F 9/3846 |
| 2019/0041957 A1* | 2/2019 | Hunt | G06F 1/324 |
| 2020/0044987 A1* | 2/2020 | Tamir | G06F 9/4812 |
| 2021/0064117 A1 | 3/2021 | Liu et al. | |
| 2022/0091657 A1* | 3/2022 | Tsien | G06F 1/3278 |

* cited by examiner

```
while(1) {
num_packets = read_burst_of_packets(&pkts);
for (x = 0; x < num_packets; x++)
    process_packets(pkts[x]);
}
}
```

FIG. 2

| POWER STATE/MODE 602 | THRESHOLD 604 | FREQUENCY 606 | VOLTAGE 608 |
|---|---|---|---|
| 0 (LOWEST) | M0 | F0 | V0 |
| 1 | M1 | F1 | V1 |
| 2 | M2 | F2 | V2 |
| 3 | M3 | F3 | V3 |
| ... | ... | ... | ... |
| Z (HIGHEST) | MZ | FZ | VZ |

HARDWARE-ASSISTED CORE FREQUENCY AND VOLTAGE SCALING IN A POLL MODE IDLE LOOP

FIELD OF INVENTION

The field of the invention relates generally to processor core frequency and voltage scaling. More specifically, the field of the invention relates to hardware-assisted core frequency and voltage scaling in a poll mode idle loop of a processor core.

BACKGROUND

Many software application programming interfaces (APIs) use polling methods in applications to enable functionality, including detecting the presence of an input/output and/or monitoring a packet or frame buffer queue. In networking and communications segments, packet processing applications can use poll mode drivers (PMDs) to configure and manage packets received from Network Interface Cards (NICs). Processing packets using polling allows applications to process the packets immediately upon arrival without waiting for an interrupt to arrive. This provides a significant performance improvement for processing high throughput packet rates.

Although this approach can improve application performance, it requires significant power consumption during idle times. In particular, use of PMDs causes a corresponding core of a processor to appear 100% busy to an operating system regardless of whether the core is actively processing packets or waiting on arrival of packets. This information on the idle or active state of the core is critical for scaling down the frequency/voltage of the core to save power during low traffic conditions. However, it is challenging for any global power management component at the system-on-a-chip (SoC) level or platform level to determine when a PMD and corresponding core is waiting for packets. Furthermore, providing this information from to these global components would incur latency impacting performance of the core.

BRIEF DESCRIPTION OF THE DRAWINGS

Embodiments of the present invention are illustrated by way of example and not limitation in the figures of the accompanying drawings, in which like references indicate similar elements and in which:

FIG. 2 shows pseudo code representing polling receipt of a packet, according to one example embodiment.

FIG. 6 shows a table with a set of power states/modes, according to one example embodiment.

DETAILED DESCRIPTION

Figure 1:
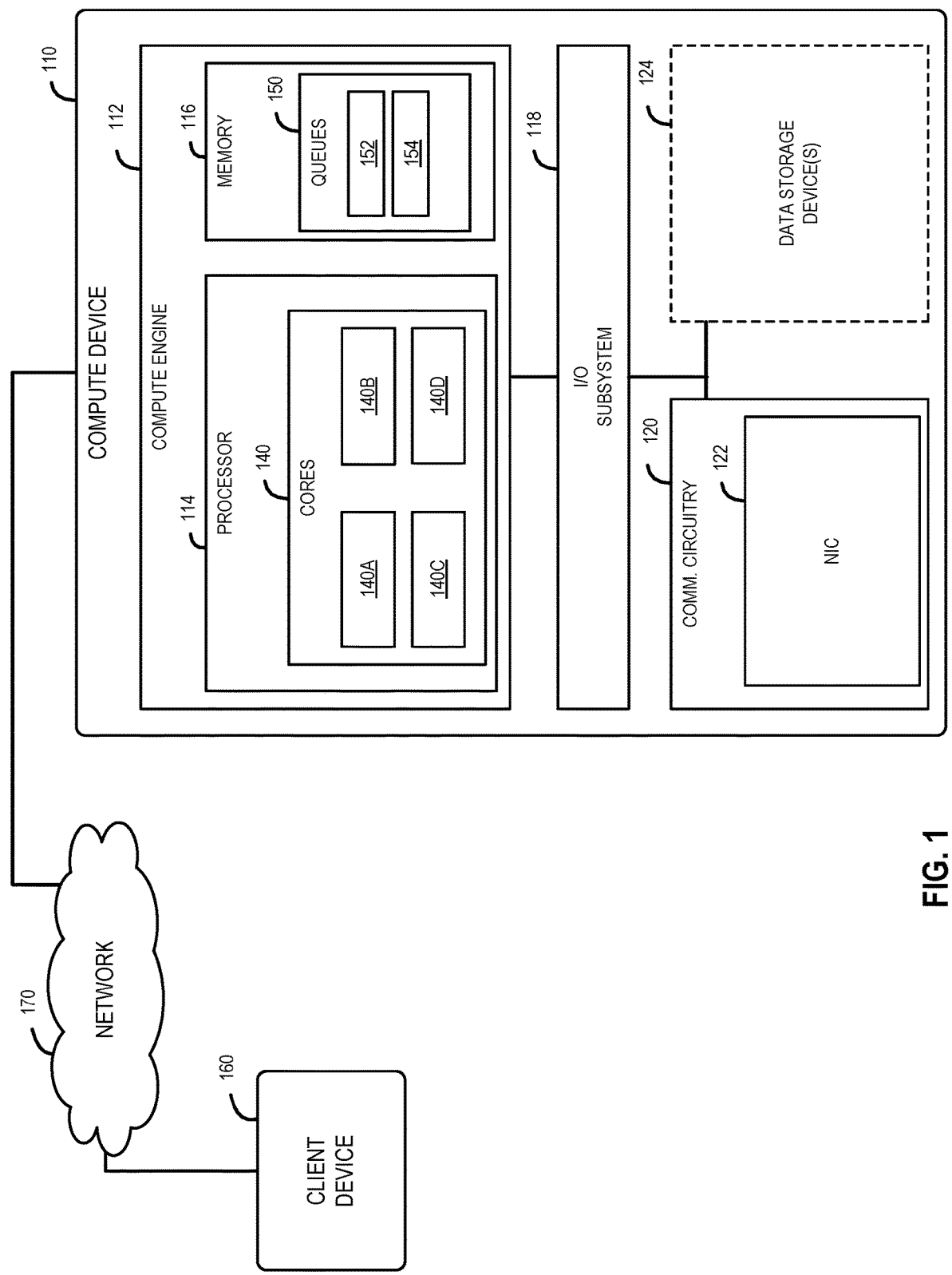
FIG. 1 shows a compute device, for efficiently detecting an idle poll loop, in communication with a client device through a network, according to one example embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In some embodiments, an application running on a core of a processor/central processing unit (CPU) tracks a packet count and try to determine the load on the network. Based on the load, the application scales power consumption of the core up or down (e.g., scale frequency and/or voltage of the core). The main disadvantage of the software approach is the latency and performance impact. In particular, detecting an idle condition involves software reading packet counters and taking actions based on a comparison with a threshold value. However, this software approach is not a viable solution in high throughput packet processing networks in which a few microseconds of delay can cause packet drop and impact the quality of the network. Such delays can directly impact call quality and hence are not implemented by telecommunications providers. Furthermore, this approach requires one dedicated core within a processor or system-on-a-chip (SoC) for monitoring the power state, which reduces the compute capacity of the system. Furthermore, as the core count in a processor/CPU increases, the software approach is not easily scalable.

In some embodiments, techniques are used to reduce CPU/processor power consumption by detecting a polling condition in the core hardware, during which a poll mode driver (PMD) is in a polling mode waiting for the arrival of the next packet and the core is not doing any useful work (e.g., processing a packet). When this condition is detected locally in the processor core, the frequency and/or voltage of the core is scaled down by the core to lower the power consumption during low traffic conditions.

The data center market is growing at a tremendous rate and there is an increased demand for cloud networking infrastructure to support this growth. This also results in an increase in energy consumption and corresponding operating expenses for corporations. Cloud Service Providers (CSPs) are looking to reduce their operating expenses by employing innovative power saving methods in their infrastructure to increase profits. In many cases, server networking platforms are designed with plenty of headroom for future traffic growth. During the first few years of deployment, these servers are expected to be in an idle/poll state/mode for an average of 42% of an operating time until they reach their full/peak capacity. Using the techniques described herein, operating expense savings can be experienced by the customer, as well as higher performance for non-polling cores. Furthermore, using the techniques described herein, customers do not need to allocate one dedicated core for monitoring power/activity states, allowing other cores for use in other mission-critical work (e.g., processing packets).

Although discussed primarily in relation to packet processing, the techniques described herein can operate in relation to other applications where core polling is used. For example, in some embodiments, the techniques described herein can be used to detect polling loops in relation to processing accelerators (e.g., graphics processing units (GPUs)). In particular, when a core has submitted a job to an accelerator, the core is waiting in a polling mode for completion of the job, as the workload job can be small and there could be dependencies, such that the core cannot be used for other tasks while the accelerator is completing the job. Through the use of the techniques described herein, the core can adjust power usage (e.g., a frequency and/or voltage can be scaled down) while the core is waiting for the accelerator task to finish.

In addition to the efficiency improvements discussed herein, the techniques described herein can provide additional benefits. For example, many graphics benchmarks and applications employ polling loops consuming unnecessary battery power. The techniques described herein can be used to increase battery life in those cases by reducing power usage, which will result in increased performance per watt of consumed energy. Furthermore, core stalling due to memory bound can also take advantage of techniques described herein to save power.

Referring now to FIG. 1, a compute device 110, for efficiently detecting an idle poll loop, is in communication with a client device 160 through a network 170. The compute device 110, in operation, may execute one or more applications (e.g., in one or more virtual machines), such as to perform services on behalf of the client device 160, using cores 140 of a processor 114. In doing so, a core 140 of the compute device 110 monitors a ratio of unsuccessful operations to successful operations (e.g., a ratio of unsuccessful to successful speculative operations, such as branch misses to branch hits, cache misses to cache hits, etc.) of the core 140. The core 140 can be assigned to continually poll a memory address for data indicative of a change in status (e.g., continually poll a queue 150 associated with a network interface controller (NIC) 122 for newly received packets, etc.). In response to a determination that the ratio exceeds a predefined threshold (e.g., 0.01%), the core 140 determines a change in status. Further, a core 140 may increase or cause another component of the compute device 110 to increase power usage (e.g., a frequency and/or voltage) of the core 140 as a function of the amount (e.g., a linear relationship) by which the ratio exceeds the predefined threshold. Similarly, a core 140 may decrease or cause another component of the compute device 110 to decrease the power usage of the core 140 as the ratio approaches the predefined threshold. As compared to cores that determine 100% utilization of the core during a PMD loop regardless of whether a change in status has occurred (e.g., regardless of whether any packets have been received by a network interface controller (NIC)), the cores 140 are able to efficiently (e.g., without dedicating hardware or software to counting the number of received packets in the NIC queue 150) and accurately determine whether a change in status has occurred, and quickly (e.g., with low latency, such as within 10 microseconds of a change in the measured ratio) scale up or scale down the power of the core 140 to conserve power and reduce the operating expenses of the compute device 110.

As shown in FIG. 1, the illustrative compute device 110 includes a compute engine 112, an input/output (I/O) subsystem 118, communication circuitry 120, and one or more data storage devices 124. Of course, in other embodiments, the compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 112 may be embodied as any type of device or collection of devices capable of performing various compute functions described below. In some embodiments, the compute engine 112 may be embodied as a single device such as an integrated circuit, an embedded system, a field-programmable gate array (FPGA), a system-on-a-chip (SOC), or other integrated system or device. In the illustrative embodiment, the compute engine 112 includes or is embodied as a processor 114 and a memory 116 (sometimes referred to as a memory device 116 or main memory 116). The processor 114 may be embodied as any type of processor capable of performing the functions described herein. For example, the processor 114 may be embodied as a multi-core processor(s), a microcontroller, or other processor or processing/controlling circuit. In some embodiments, the processor 114 may be embodied as, include, or be coupled to an FPGA, an application specific integrated circuit (ASIC), reconfigurable hardware or hardware circuitry, or other specialized hardware to facilitate performance of the functions described herein. In the illustrative embodiment, the processor 114 includes a corresponding set of cores 140A, 140B, 140C, and 140D. Each of the cores 140 may be embodied as any device or circuitry capable of receiving instructions and performing calculations or actions based on those instructions. While four cores 140 are shown in the processor 114, it should be understood that in other embodiments, the number of cores 140 may be different.

The main memory 116 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as dynamic random access memory (DRAM) or static random access memory (SRAM). One particular type of DRAM that may be used in a memory module is synchronous dynamic random-access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device 116 is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. In one embodiment, the memory device 116 may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device 116 may refer to the die itself and/or to a packaged memory product.

In some embodiments, 3D crosspoint memory (e.g., Intel 3D XPoint™ memory) may comprise a transistor-less stackable crosspoint architecture in which memory cells sit at the intersection of word lines and bit lines and are individually addressable and in which bit storage is based on a change in bulk resistance. In some embodiments, all or a portion of the main memory 116 may be integrated into the processor 114. In operation, the main memory 116 may store various software and data used during operation such as applications, programs, libraries, and drivers. In the illustrative embodiment, the memory 116 defines one or more queues 150 (e.g., queues 152 and 154), each of which may be embodied as a set of memory accessible at one or more memory addresses and capable of storing data sets (e.g., packets) to be operated on by one or more of the cores 140 and/or other components of the compute device 110. For example, the queue 152 may temporarily store packets received by the NIC 122 (e.g., through the network 170 from the client device 160 or from another source) and the queue 154 may temporarily store packets to be sent by the NIC 122 (e.g., through the network 170).

The compute engine 112 is communicatively coupled to other components of the compute device 110 via the I/O subsystem 118, which may be embodied as circuitry and/or components to facilitate input/output operations with the compute engine 112 (e.g., with the processor 114 and/or the main memory 116) and other components of the compute device 110. For example, the I/O subsystem 118 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 118 may form a portion of a system-on-a-chip (SoC) and be incorporated, along with one or more of the processor 114, the main memory 116, and other components of the compute device 110, into the compute engine 112.

The communication circuitry 120 may be embodied as any communication circuit, device, or collection thereof, capable of enabling communications over the network 170 between the compute device 110 and another compute device (e.g., the client device 160, etc.). The communication circuitry 120 may be configured to use any one or more communication technology (e.g., wired or wireless communications) and associated protocols (e.g., Ethernet, Bluetooth®, Wi-Fi®, WiMAX, etc.) to affect such communication.

The illustrative communication circuitry 120 includes a network interface controller (NIC) 122, which may also be referred to as a host fabric interface (HFI). The NIC 122 may be embodied as one or more add-in-boards, daughter cards, network interface cards, controller chips, chipsets, or other devices that may be used by the compute device 110 to connect with another compute device (e.g., the client device 160, etc.). In some embodiments, the NIC 122 may be embodied as part of a system-on-a-chip (SoC) that includes one or more processors, or included on a multichip package that also contains one or more processors. In some embodiments, the NIC 122 may include a local processor (not shown) and/or a local memory (not shown) that are both local to the NIC 122. In such embodiments, the local processor of the NIC 122 may be capable of performing one or more of the functions of the compute engine 112 described herein. Additionally or alternatively, in such embodiments, the local memory of the NIC 122 may be integrated into one or more components of the compute device 110 at the board level, socket level, chip level, and/or other levels.

The one or more illustrative data storage devices 124 may be embodied as any type of devices configured for short-term or long-term storage of data such as, for example, memory devices and circuits, memory cards, hard disk drives, solid-state drives, or other data storage devices. Each data storage device 124 may include a system partition that stores data and firmware code for the data storage device 124. Each data storage device 124 may also include one or more operating system partitions that store data files and executables for operating systems.

The client device 160 may have components similar to those described in FIG. 1 with reference to the compute device 110. The description of those components of the compute device 110 is equally applicable to the description of components of the client device 160 and is not repeated herein for clarity of the description. Further, it should be appreciated that any of the compute device 110 and the client device 160 may include other components, sub-components, and devices commonly found in a computing device, which are not discussed above in reference to the compute device 110 and not discussed herein for clarity of the description.

As described above, the compute device 110 and the client device 160 are illustratively in communication via the network 170, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

As noted above, packet processing application code can use polling for processing incoming packets from a NIC device (e.g., the NIC 122). This packet processing application code can be implemented using poll mode drivers (PMDs). From the operating system perspective, use of polling causes a corresponding core 140 to appear entirely busy even if the core 140 is not doing any useful work (e.g., the core 140 is only determining whether a packet is received rather than substantive processing of a packet). For example, polling in a packet processing scenario can be represented by the pseudo code 200 shown in in FIG. 2. In particular, the pseudo code 200 demonstrates a continually operating while loop that processes/analyzes packets as they are received. When no packets have been received by the core 140 performing this routine, the pseudo code 200 continually loops without performing any meaningful processing operations (e.g., without performing the process_packets( ) function). This continuous loop may cause the core 140 to appear as though it is operating at full capacity (e.g., operating at 100%); however, the corresponding actions are inconsequential.

A core 140 can implement branch predictor unit (BPU) logic to predict which branch application code flow will take in the future. The BPU logic implements complex prediction algorithms to provide accurate predictions and improve overall processor/core performance by minimizing branch misses. In some embodiments, the BPU logic includes or otherwise utilizes counters for branch miss and hit counts. A branch miss-to-hit ratio gives an indication of branch prediction quality and can be defined as shown in Equation 1:

$$\text{Branch\_Miss\_to\_Hit\_Ratio} = \text{Branches\_Misses} / \text{Branch\_Hits} \qquad \text{Equation 1}$$

In particular, when the branch miss-to-hit ratio is low (e.g., a low number of branch misses and a comparatively larger number of branch hits), the branch prediction quality is determined to be high. Conversely, when the branch miss-to-hit ratio is high, the branch prediction quality is determined to be low.

When a packet processing application running on a core 140 is in a poll loop and not receiving any traffic, the percentage/number of branch misses is small (e.g., less than 0.01%) in comparison to the percentage/number of branch hits. Thus, the branch miss-to-hit ratio is low and the BPU logic is working well/accurately. However, as soon as packet traffic starts to flow (e.g., the core 140 receives packets) and the core 140 starts executing code based on the received packets, different/various branches will be taken by the core 140. Since the core 140 is taking less predictable branches than when a poll loop is being performed, the percentage/ number of branch misses increases/jumps significantly. This increase can be linear with the amount of traffic (network packets) being received by the core 140, which results in a significantly higher branch miss-to-hit ratio. The higher branch miss-to-hit ratio is not only due to the increase in the number of packets but also due to packet processing, including flow decisions, parsing, etc.

Figure 3:
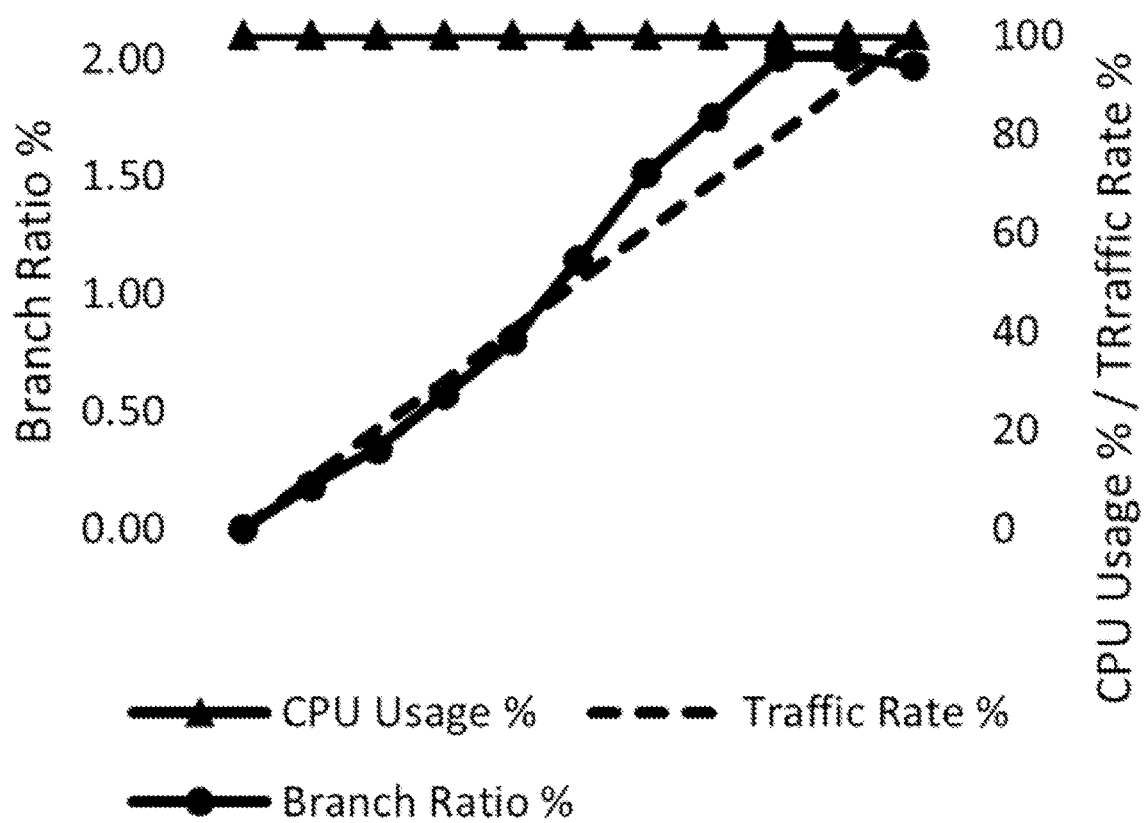
FIG. 3 shows a relationship between processor usage, a branch hit and miss ratio, and a traffic rate, according to one example embodiment.

FIG. 3 shows a relationship 300 between processor usage, a branch hit and miss ratio, and a traffic rate (e.g., rate that packets are placed in the queue 152). In the illustrative embodiment, the processor/CPU/core usage appears constant at 100% (e.g., to an operating system of the compute device 110), while the actual rate of traffic varies from 0% to 100% over the same time period. However, unlike the processor usage data, the ratio of branch misses to branch hits increases as the packet traffic increases. As noted above and as will be described in greater detail below, by selectively adjusting power usage of the core 140 as a function of the ratio of unsuccessful operations to successful operations of the core 140 (e.g., branch misses to branch hits), rather than controlling power as a function of the reported processor usage, the compute device 110 may accurately and efficiently determine the power needs of the core 140 and scale the power usage of the core 140 accordingly, thereby conserving power in time periods of low traffic. The detection of idle loops is not limited to using branch miss-to-hit ratio metrics. In some embodiments, scalable metrics in the core 140, such as pause, UMWAIT, core page faults, and core stalls, can also be used to detect idle loops and adjust power usage.

Figure 4:
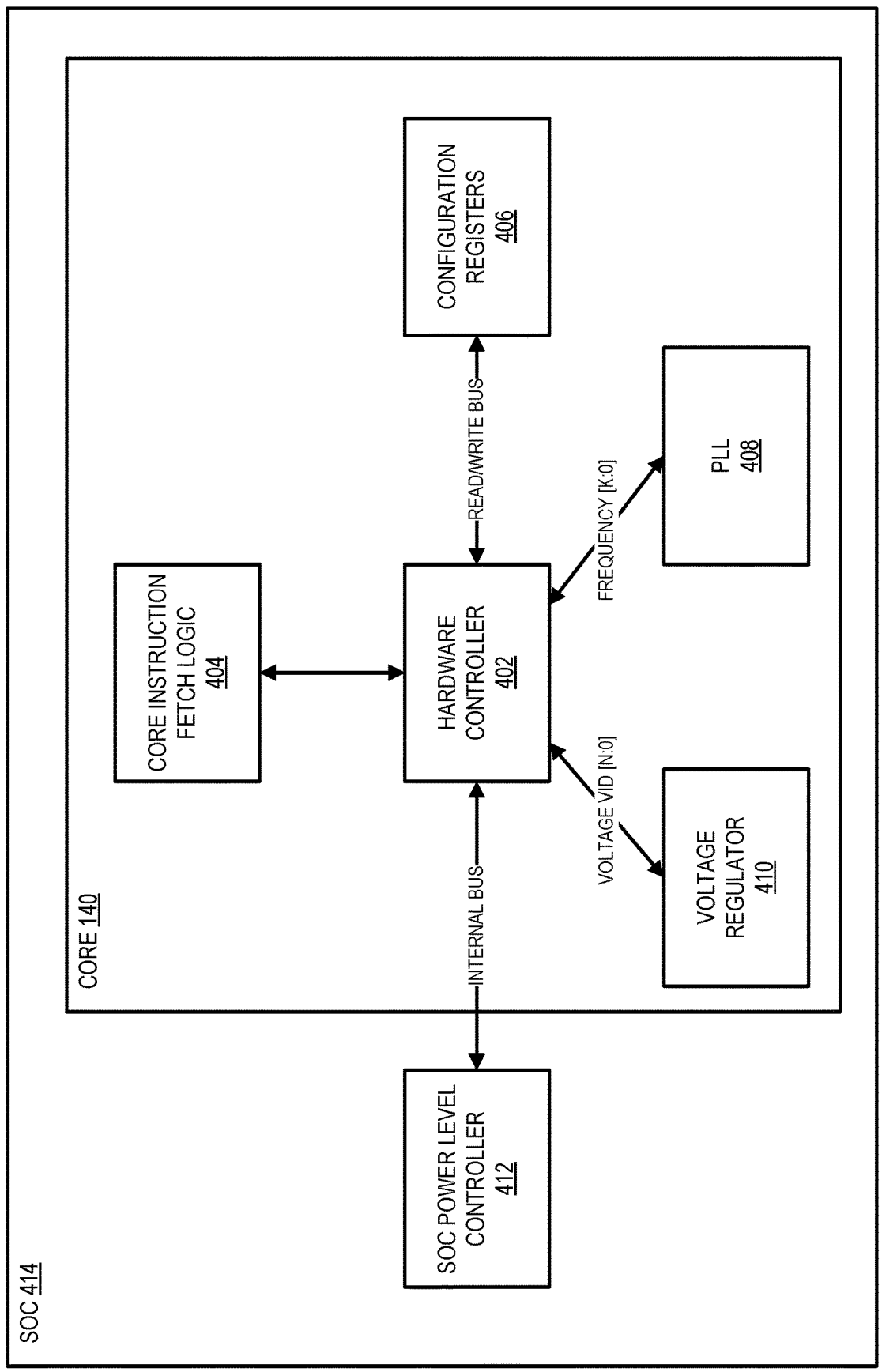
FIG. 4 shows components of a core operating within a system-on-a-chip (SoC), according to one example embodiment.

In one embodiment, a hardware controller of a core 140 can implement an idle loop detection technique for use in adjusting power usage of the core 140. FIG. 4 shows components of a core 140 operating within an SoC 414, according to one example embodiment. As shown in FIG. 4, the core 140 includes (1) a hardware controller 402 for detecting idle loops within the core 140 and scaling/adjusting the power of the core 140 based on detection of these idle loops; (2) core instruction fetch logic 404 that provides metrics/telemetry data to the hardware controller 402 for determining/detecting an idle loop; (3) configuration registers 406 that store configurable threshold values; (4) a voltage regulator 410, which can be used to adjust a voltage of the core 140; (5) a PLL/clock source 408, which can be used to adjust a frequency of the core 140; and (6) an SoC level power controller 412 to provide power limits for the core 140. In this configuration, the hardware controller 402 is able to access telemetry data within the core 140 more frequently such that power adjustments of the core 140 can be made more efficiently/dynamically in comparison to techniques that control power from outside the core 140. In particular, the hardware controller 402 can access branch hit and miss data from the core instruction fetch logic 404 and thresholds from the configuration registers 406 with greater speed and regularity such that corresponding power adjustments (e.g., voltage and frequency adjustments) can be made. Further, since each core 140 includes a separate hardware controller 402 for monitoring telemetry data and making power adjustments within the core 140, this configuration offers a more scalable and faster system than systems that rely on centralized controllers within a processor or SoC to make power adjustments. For example, in embodiments in which a single core is devoted to querying each core within a processor and adjusting power settings (e.g., in a four-core processor, a first core is devoted to querying, monitoring, and adjusting power settings for the other three cores), the core used for managing the other cores cannot perform other processes (e.g., processing of received packets).

Figure 5:
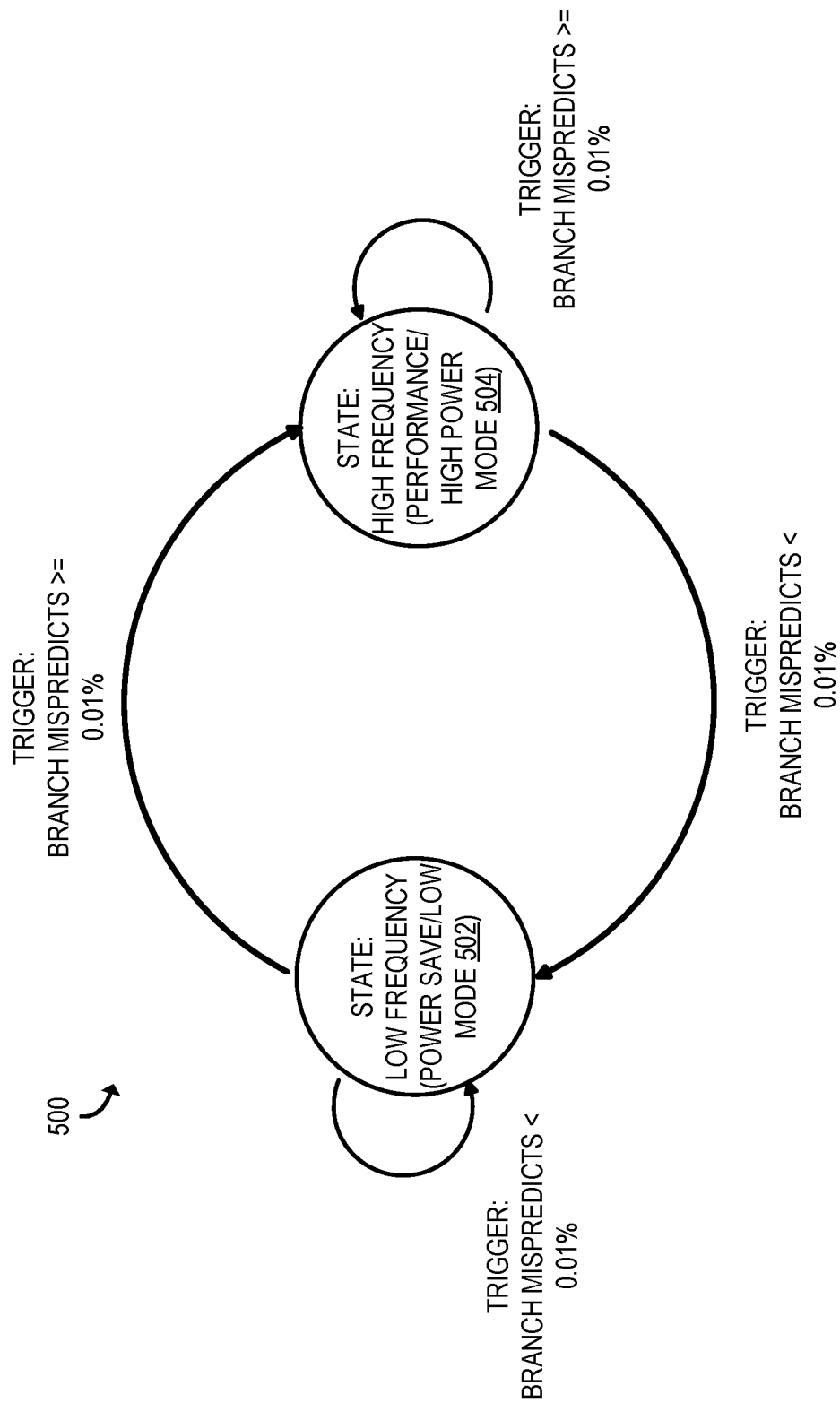
FIG. 5 shows a state machine that supports both a low-power mode and a high-power mode, according to one example embodiment.

In one embodiment, the hardware controller logic 402 supports two power states/modes. For example, the hardware controller logic 402 supports (1) a low-power mode (sometimes referred to as a power save mode/state), in which the core 140 is operating at a low frequency (possibly also a low voltage) and (2) a high-power mode (sometimes referred to as a performance mode/state), in which the core 140 is operating at a comparatively high frequency (possibly also a comparatively high voltage). For instance, in a low-power mode, the core 140 is operating at the lowest frequency supported by the core 140, while in a high-power mode, the core 140 is operating at the highest frequency supported by the core 140. FIG. 5 shows a state machine 500 that supports both a low-power mode 502 and a high-power mode 504, according to one example embodiment. In this example, transitions between the low-power mode 502 and the high-power mode 504 are based on a branch miss-to-hit ratio. In particular, in response to detecting a branch miss-to-hit ratio that is below a branch miss-to-hit threshold (e.g., 0.01%), the hardware controller logic 402 causes the core 140 to move to or remain in the low-power mode 502. Conversely, in response to detecting a branch miss-to-hit ratio that is equal to or greater than the branch miss-to-hit threshold, the hardware controller logic 402 causes the core 140 to move to or remain in the high-power mode 504.

However, the hardware controller logic 402 is not limited to two power modes and can support Z power modes, where Z is greater than or equal to two. For example, FIG. 6 shows a table 600 with Z power states/modes 602, according to one example embodiment. As shown in FIG. 6, each state/mode 602 (e.g., power states/modes 0-Z) is associated with a threshold 604 (e.g., thresholds M0-MZ), a frequency 606 (e.g., frequencies F0-FZ), and a voltage 608 (e.g., voltages V0-VZ). Upon determining that a threshold 604 has been met, the hardware controller logic 402 causes the core 140 to change to the corresponding voltage 606 and frequency 608.

Figure 7:
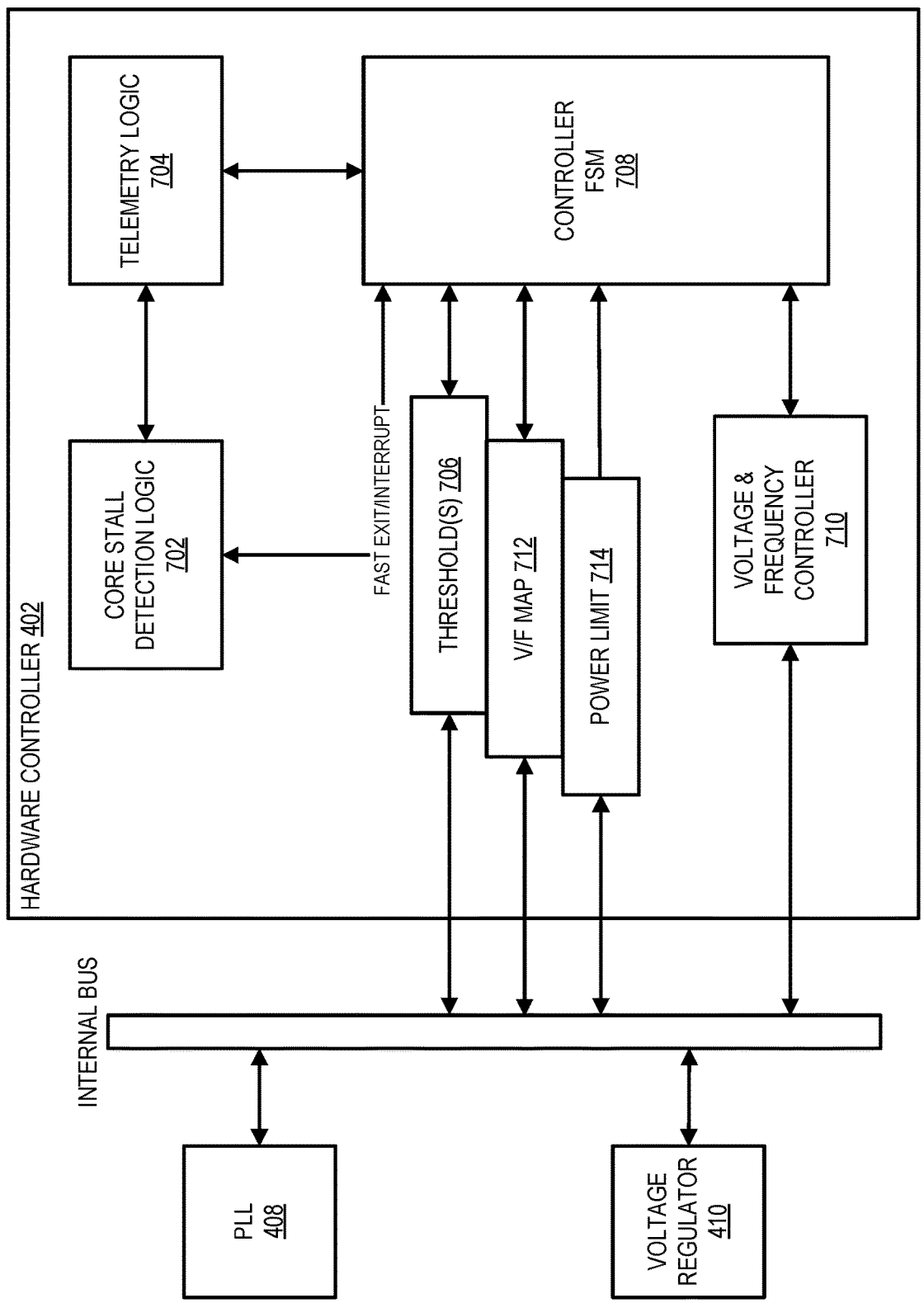
FIG. 7 shows components of the hardware controller logic of a core, according to one example embodiment.

FIG. 7 shows components of the hardware controller logic 402 of a core 140, according to one example embodiment. As shown in FIG. 7, the hardware controller logic 402 includes core stall detection logic 702. The core stall detection logic 702 receives telemetry data from the telemetry logic 704. In particular, the core stall detection logic 702 receives indications or counts of one or more of (1) branch hits, (2) branch misses, (3) stalls, (4) pauses, and (5) UMWAIT instructions. Based on these indications, the core stall detection logic 702 can determine if the core 140 is in a poll loop or is not in a poll loop. In some embodiments, the core stall detection logic 702 can determine if the core 140 is in a poll loop (sometimes referred to as an idle loop state) based on the thresholds 706. In one embodiment, the thresholds 706 are configurable per core 140 and/or per application running within the core 140. In one embodiment, the core stall detection logic 702 maintains a single hardware counter for tracking a ratio of branch misses to branch hits. In this embodiment, the increment amount for the hardware counter is based on the thresholds 706. For example, when the threshold value is 0.01%, the increment value for a branch hit is 1 and the increment value for a branch miss is 1000. When the counter has a value of zero, the counter has met the threshold 706.

Although described in relation to a branch miss-to-hit ratio, the core stall detection logic 702 can determine a poll loop based on other factors. For example, upon detection of a number of stalls above a threshold (i.e., the core 140 is continually polling and waiting for data/packets to be received), the core stall detection logic 702 can detect an opportunity to enter into a lower power state/mode. Detection of a pause or wait, in which the core 140 is waiting for data or an activity to take place, can be similarly used to detect an opportunity to enter into a lower power state/mode.

Upon detecting that the core 140 is not in an idle loop, the core stall detection logic 702 triggers the controller finite state machine (FSM) 708 (sometimes referred to as a power controller 708) to change power settings for the core 140. In particular, the core stall detection logic 702 can send an interrupt signal to the controller FSM 708 to cause the controller FSM 708 to adjust power settings for the core 140. In some embodiments, the controller FSM 708 triggers the voltage and frequency controller 710 to alter the power settings of the core 140 via power settings (e.g., voltage and/or frequency settings) sent over an internal bus of the core 140 to the voltage regulator 410 and/or PLL 408 associated with the core 140. In some embodiments, the interrupt signal sent to the controller FSM 708 causes the core 140 to move up a single step in power settings. In particular, when the core 140 supports multiple power states/modes (e.g., two or three power states/modes), the interrupt signal from the core stall detection logic 702 causes the controller FSM 708 to move the core 140 from the current power state/mode to the next higher state/mode until a highest mode is reached. Accordingly, if the core stall detection logic 702 determines that the telemetry data from the telemetry logic 704 results in the need to move the core 140 from a current/first power state/mode to a third power state/mode, the core stall detection logic 702 sends two interrupt signals to the controller FSM 708. In another embodiment, the interrupt signal can include an indicator (i.e., an interrupt code) of the power state/mode and the controller FSM 708 uses this indicator to select a new power state/mode for the core 140.

In one embodiment, the hardware controller 402 includes a voltage/frequency (V/F) map 712. The voltage/frequency map 712 includes or otherwise represents a table of power states/modes. For example, the voltage/frequency map 712 can be similar or identical to the table 600. In some embodiments, the hardware controller 402 includes a power limit 714. The power limit 714 indicates an upper bound regarding power settings that can be used by the core 140. In particular, the SoC level power controller 412 can allocate a particular amount of power per core 140 in the processor 114. For example, the SoC level power controller 412 can allocate an upper power limit (e.g., upper voltage and/or frequency limit) based on expected demand across all cores 140 or other elements of the SoC. Accordingly, the controller FSM 708 may adjust the voltage and/or frequency of the core 140 without violating the power limit 714. For example, the core stall detection logic 702 and/or the controller FSM 708 may determine to set the core 140 to the highest power state/mode. However, the voltage and/or frequency of this power state/mode may violate the power limit 714. Accordingly, the controller FSM 708 will either cause the core 140 to move to the next highest power state/mode that does violate the power limit 714 or cause the core 140 to move to the power limit 714. In some embodiments, the V/F map 712 is set according to the power limit 714. In particular, the entries in a table represented by the V/F mapping 712 can be adjusted such that no entry exceeds the power limit 714 (e.g., the voltage and frequency values are adjusted/reduced to the power limit 714 or entries are removed that violate the power limit 714). As the power limit 714 is increased, the V/F map 712 can be adjusted add power states/modes or increase frequencies and voltages according to the power limit 714.

Although described as an upper limit, the power limit 714 may also include a lower limit. For example, the power limit 714 can include one or more of an upper frequency and/or voltage limit and a lower frequency and/or voltage limit.

In one embodiment, the core stall detection logic 702 can cause the core 140 to scale down power settings (e.g., decrease voltage and/or frequency) while the controller FSM 708 can cause the core to scale up power settings (e.g., increase voltage and/or frequency). For example, the controller FSM 708 can be tracking telemetry data from the telemetry logic 704 along with the core stall detection logic 702 and determining when the core 140 is not in a poll loop such that the controller FSM 708 can cause the core 140 to increase power settings. Accordingly, the core stall detection logic 702 can cause the core 140 to enter a lower power state, while the controller FSM 708 can cause the core 140 to enter a higher power state. In one embodiment, the controller FSM 708 examines trends in telemetry data over a short time-period while the core stall detection logic 702 determines trends over a long time-period. In particular, the core stall detection logic 702 can determine opportunistic but conservative instances to enter into a lower power state based on long-term activity trends (e.g., an average branch miss-to-hit ratio over a long time period), while the controller FSM 708 can quickly exit from the lower power state into a higher power state in response to short-term activity trends. In this fashion, application and/or user experience is not impacted by the core 140 being in a low power state, as the core 140 can quickly exit from a low power state when the need for more power is detected.

Figure 8:
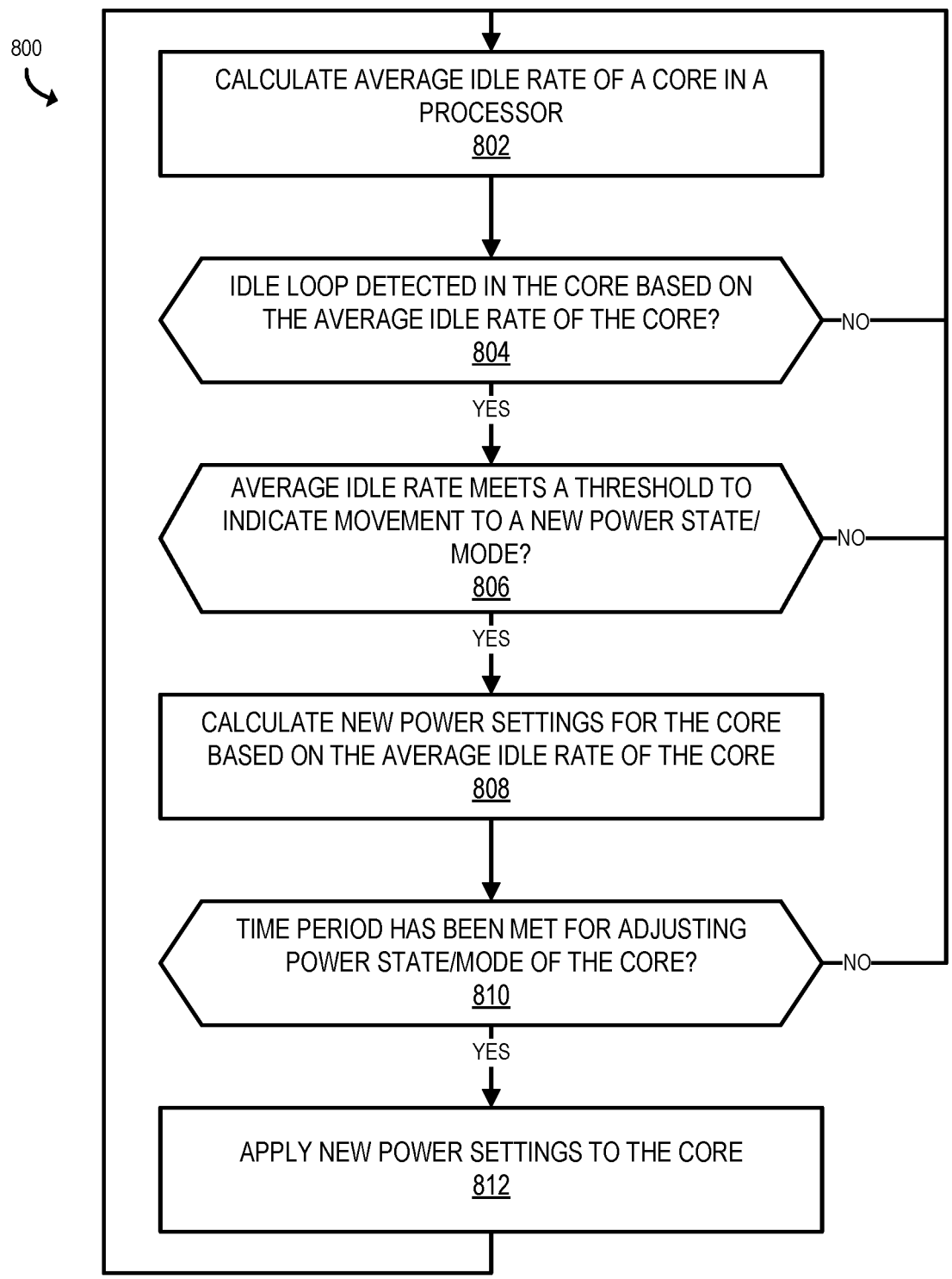
FIG. 8 shows a method for adjusting power settings of a core, according to one example embodiment.

Turning now to FIG. 8, a method 800 will be described for adjusting power settings of a core 140, according to one example embodiment. The method 800 can be performed by one or more of the components described above in reference to the other figures. In particular, the method 800 can be performed by a hardware controller 402 of a core 140 to adjust power settings of the core 140.

As shown in FIG. 8, the method 800 can commence at operation 802 with the hardware controller 402 of the core 140 calculating an average idle rate for the core 140. In particular, the hardware controller 402 may determine the ratio of unsuccessful speculative operations (e.g., branch misses, which are incorrect predictions that the core 140 will perform a particular branch operation) to successful speculative operations (e.g., branch hits, which are correct predictions that the core 140 will perform a particular branch operation). Other factors can also be used to determine an idle rate for the core 140, including (1) stalls, (2) pauses, (3) UMWAITS, and (4) cache hits and misses. In some embodiments, the branch miss-to-hit ratio can be calculated using a single hardware counter that is incremented and decremented according to increment and decrement levels that are established based on a set of thresholds.

At operation 804, the hardware controller 402 determines whether the idle rate for the core 140 indicates that the core 140 is experiencing an idle loop. In particular, when the idle rate for the core 140 meets a first threshold (e.g., an idle loop threshold), the hardware controller 402 determines that the idle rate for the core 140 indicates that the core 140 is experiencing an idle loop. In response to determining that the core 140 is not experiencing an idle loop, the method 800 returns to operation 802. Conversely, in response to determining that the core 140 is experiencing an idle loop, the method 800 moves to operation 806.

At operation 806, the hardware controller 402 determines if the average idle rate meets a threshold to indicate movement of the core 104 to a new power state/mode. In particular, as noted above, each power state/mode can be associated with a threshold value. When the idle rate does not meet/satisfy a threshold of a next power state/mode (e.g., a next lower power state, which is associated with power settings lower than the current power settings), the method 800 returns to operation 802. Conversely, when the idle rate does meet/satisfy a threshold of a next power state/mode (e.g., a next lower power state, which is associated with power settings lower than the current power settings), the method 800 moves to operation 808.

At operation 808, the hardware controller 402 calculates target power settings for the core 140. In particular, the hardware controller 402 can utilize hysteresis, including the historical branch miss-to-hit ratio, to determine target power settings for the core 140.

At operation 810, the hardware controller 402 determines whether a time period has been met for adjusting power settings of the core 140. In particular, lowering power settings of the core 140 can be viewed as a sensitive operation that may have quality-of-service/performance impacts. Accordingly, the hardware controller 402 may only initiate a power reduction of the core 140 (e.g., reduce frequency and/or voltage of the core 140) after examining characteristics of the core 140 over a discrete period of time. In response to determining that the period of time has not elapsed, the method 800 returns to operation 802. However, in response to determining that the time period has been met, the method 800 moves to operation 812.

At operation 812, the hardware controller triggers or otherwise causes the core 140 to adjust power parameters to meet the new power settings. As described herein, the hardware controller 402 cautiously uses hysteresis over an extended period of time to lower the power settings of the core 140. However, the hardware controller 402 can make quicker decisions to raise power settings without use of a long hysteresis process such that performance of applications running on the core 140 is not negatively impacted.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FURTHER EXAMPLES

Example 1 provides an exemplary hardware controller within a core of a processor to adjust power settings of the core, the hardware controller comprising: telemetry logic to generate telemetry data that indicates an activity state of the core; core stall detection logic to determine, based on the telemetry data from the telemetry logic, whether the core is in an idle loop state; and a power controller that, in response to the core stall detection logic determining that the core is in the idle loop state, is to decrease a power mode of the core from a first power mode associated with a first set of power settings to a second power mode associated with a second set of power settings.

Example 2 provides the substance of the exemplary hardware controller of Example 1, wherein the telemetry data includes one or more of (1) a number of branch hits and (2) a number of branch misses, and wherein the core stall detection logic is to determine the core is in the idle loop state by calculating a branch miss-to-hit ratio over a time period and based on a set of thresholds.

Example 3 provides the substance of the exemplary hardware controller of Example 2, wherein the core stall detection logic is to calculate the branch miss-to-hit ratio using a hardware counter.

Example 4 provides the substance of the exemplary hardware controller of Example 3, wherein the core stall detection logic is to set an increment level and a decrement level for the hardware counter based on the set of thresholds.

Example 5 provides the substance of the exemplary hardware controller of Example 4, wherein the core stall detection logic is to (1) increment the hardware counter by the increment level in response to the telemetry data indicating a branch hit occurred in the core and (2) decrement the hardware counter by the decrement level in response to the telemetry data indicating a branch miss occurred in the core.

Example 6 provides the substance of the exemplary hardware controller of Example 1, wherein the power controller is to receive the telemetry data from the telemetry logic and is to determine, based on the telemetry data from the telemetry logic, whether the core is in the idle loop state.

Example 7 provides the substance of the exemplary hardware controller of Example 6, wherein the power controller is to, in response to the core stall detection logic determining that the core is not in the idle loop state, raise the power mode of the core from the second mode associated with the second set of power settings to the first mode associated with the first set of power settings.

Example 8 provides the substance of the exemplary hardware controller of Example 1, wherein the idle poll loop includes the core polling an address to determine whether a packet has been received for processing by the core.

Example 9 provides an exemplary method performed by a hardware controller within a core of a processor to adjust power settings of the core, the method comprising: generating, by the hardware controller, telemetry data that indicates an activity state of the core; determining, by the hardware controller, based on the telemetry data whether the core is in an idle loop state; and decreasing, by the hardware controller in response to determining that the core is in the idle loop state, a power mode of the core from a first power mode associated with a first set of power settings to a second power mode associated with a second set of power settings.

Example 10 provides the substance of the exemplary method of Example 9, wherein the telemetry data includes one or more of (1) a number of branch hits and (2) a number of branch misses, and wherein the hardware controller is to determine the core is in the idle loop state by calculating a branch miss-to-hit ratio over a time period and based on a set of thresholds.

Example 11 provides the substance of the exemplary method of Example 10, wherein the hardware controller is to calculate the branch miss-to-hit ratio using a hardware counter.

Example 12 provides the substance of the exemplary method of Example 11, further comprising: setting, by the hardware controller, an increment level and a decrement level for the hardware counter based on the set of thresholds.

Example 13 provides the substance of the exemplary method of Example 12, further comprising: incrementing, by the hardware controller, the hardware counter by the increment level in response to the telemetry data indicating a branch hit occurred in the core; and decrementing, by the hardware controller, the hardware counter by the decrement level in response to the telemetry data indicating a branch miss occurred in the core.

Example 14 provides the substance of the exemplary method of Example 9, further comprising: increasing, by the hardware controller in response to determining that the core is not in the idle loop state, the power mode of the core from the second mode associated with the second set of power settings to the first mode associated with the first set of power settings.

Example 15 provides the substance of the exemplary method of Example 9, wherein the idle poll loop includes the core polling an address to determine whether a packet has been received for processing by the core.

Example 16 provides an exemplary non-transitory computer readable medium that stores instructions, which when executed by a hardware controller of a core, cause the hardware controller to: generate telemetry data that indicates an activity state of the core; determine based on the telemetry data whether the core is in an idle loop state; and decrease, in response to determining that the core is in the idle loop state, a power mode of the core from a first power mode associated with a first set of power settings to a second power mode associated with a second set of power settings.

Example 17 provides the substance of the exemplary non-transitory computer readable medium of Example 16, wherein the telemetry data includes one or more of (1) a number of branch hits and (2) a number of branch misses, and wherein the hardware controller is to determine the core is in the idle loop state by calculating a branch miss-to-hit ratio over a time period and based on a set of thresholds.

Example 18 provides the substance of the exemplary non-transitory computer readable medium of Example 17, wherein the hardware controller is to calculate the branch miss-to-hit ratio using a hardware counter.

Example 19 provides the substance of the exemplary non-transitory computer readable medium of Example 18, wherein the instructions further cause the processor to: set an increment level and a decrement level for the hardware counter based on the set of thresholds; increment the hardware counter by the increment level in response to the telemetry data indicating a branch hit occurred in the core;

and decrement the hardware counter by the decrement level in response to the telemetry data indicating a branch miss occurred in the core.

Example 20 provides the substance of the exemplary non-transitory computer readable medium of Example 16, wherein the instructions further cause the processor to: increase, in response to determining that the core is not in the idle loop state, the power mode of the core from the second mode associated with the second set of power settings to the first mode associated with the first set of power settings.

What is claimed is:

1. A hardware controller within a core of a processor to adjust power settings of the core, the hardware controller comprising:
   telemetry logic to generate telemetry data that indicates an activity state of the core,
      wherein the telemetry data includes one or more of (1) a number of branch hits and (2) a number of branch misses;
   core stall detection logic to determine, based on the telemetry data from the telemetry logic, whether the core is in an idle loop state, wherein the core stall detection logic is to determine the core is in the idle loop state by calculating a branch miss-to-hit ratio over a time period and based on a set of thresholds, wherein the core stall detection logic is to calculate the branch miss-to-hit ratio using a hardware counter and set an increment level and a decrement level for the hardware counter based on the set of thresholds; and
   a power controller that, in response to the core stall detection logic determining that the core is in the idle loop state, is to decrease a power mode of the core from a first power mode associated with a first set of power settings to a second power mode associated with a second set of power settings.

2. The hardware controller of claim 1, wherein the core stall detection logic is to (1) increment the hardware counter by the increment level in response to the telemetry data indicating a branch hit occurred in the core and (2) decrement the hardware counter by the decrement level in response to the telemetry data indicating a branch miss occurred in the core.

3. The hardware controller of claim 1, wherein the power controller is to receive the telemetry data from the telemetry logic and is to determine, based on the telemetry data from the telemetry logic, whether the core is in the idle loop state.

4. The hardware controller of claim 3, wherein the power controller is to, in response to the core stall detection logic determining that the core is not in the idle loop state, raise the power mode of the core from a second mode associated with the second set of power settings to a first mode associated with the first set of power settings.

5. The hardware controller of claim 1, wherein the idle loop state includes the core polling an address to determine whether a packet has been received for processing by the core.

6. A method performed by a hardware controller within a core of a processor to adjust power settings of the core, the method comprising:
   generating, by the hardware controller, telemetry data that indicates an activity state of the core, wherein the telemetry data includes one or more of (1) a number of branch hits and (2) a number of branch misses;
   determining, by the hardware controller, based on the telemetry data whether the core is in an idle loop state, wherein the hardware controller is to determine the core is in the idle loop state by calculating a branch miss-to-hit ratio over a time period and based on a set of thresholds, wherein the hardware controller is to calculate the branch miss-to-hit ratio using a hardware counter;
   setting, by the hardware controller, an increment level and a decrement level for the hardware counter based on the set of thresholds; and
   decreasing, by the hardware controller in response to determining that the core is in the idle loop state, a power mode of the core from a first power mode associated with a first set of power settings to a second power mode associated with a second set of power settings.

7. The method of claim 6, further comprising:
   incrementing, by the hardware controller, the hardware counter by the increment level in response to the telemetry data indicating a branch hit occurred in the core; and
   decrementing, by the hardware controller, the hardware counter by the decrement level in response to the telemetry data indicating a branch miss occurred in the core.

8. The method of claim 6, further comprising:
   increasing, by the hardware controller in response to determining that the core is not in the idle loop state, the power mode of the core from a second mode associated with the second set of power settings to a first mode associated with the first set of power settings.

9. The method of claim 6, wherein the idle loop state includes the core polling an address to determine whether a packet has been received for processing by the core.

10. A non-transitory computer readable medium that stores instructions, which when executed by a hardware controller of a core, cause the hardware controller to:
    generate telemetry data that indicates an activity state of the core, wherein the telemetry data includes one or more of (1) a number of branch hits and (2) a number of branch misses;
    determine based on the telemetry data whether the core is in an idle loop state, wherein
       the hardware controller is to determine the core is in the idle loop state by calculating a branch miss-to-hit ratio over a time period and based on a set of thresholds, wherein the hardware controller is to calculate the branch miss-to-hit ratio using a hardware counter;
    set an increment level and a decrement level for the hardware counter based on the set of thresholds;
    increment the hardware counter by the increment level in response to the telemetry data indicating a branch hit occurred in the core; and
    decrease, in response to determining that the core is in the idle loop state, a power mode of the core from a first power mode associated with a first set of power settings to a second power mode associated with a second set of power settings.

11. The non-transitory computer readable medium of claim 10, wherein the instructions further cause the hardware controller to:
    increase, in response to determining that the core is not in the idle loop state, the power mode of the core from a second mode associated with the second set of power settings to a first mode associated with the first set of power settings.

* * * * *